(12) United States Patent
Li et al.

(10) Patent No.: US 9,397,525 B2
(45) Date of Patent: Jul. 19, 2016

(54) ELECTRIC MOTOR

(75) Inventors: Yue Li, Hong Kong (CN); Mao Xiong Jiang, Shenzhen (CN); Bao Ting Liu, Shenzhen (CN); Chui You Zhou, Hong Kong (CN); Jin Yun Gan, Hong Kong (CN); Jian Zhao, Shenzhen (CN); Yong Li, Shenzhen (CN); Hong Wei Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 372 days.

(21) Appl. No.: 13/435,948

(22) Filed: Mar. 30, 2012

(65) Prior Publication Data

US 2012/0248927 A1 Oct. 4, 2012

(30) Foreign Application Priority Data

Apr. 1, 2011 (CN) .......................... 2011 1 0085588

(51) Int. Cl.
*H02K 1/14* (2006.01)
*H02K 1/18* (2006.01)

(52) U.S. Cl.
CPC . *H02K 1/146* (2013.01); *H02K 1/18* (2013.01)

(58) Field of Classification Search
CPC ................................ H02K 1/18; H02K 1/146

USPC .................................... 310/216.008, 216.009
See application file for complete search history.

(56) References Cited

U.S. PATENT DOCUMENTS

| 4,707,910 | A | | 11/1987 | Saeed | |
|---|---|---|---|---|---|
| 5,402,028 | A | * | 3/1995 | Koeber et al. | .......... 310/216.114 |
| 5,627,424 | A | | 5/1997 | Steiner | |
| 5,659,218 | A | | 8/1997 | Kliman et al. | |
| 5,955,814 | A | * | 9/1999 | Fujiwara | ................ 310/216.087 |
| 2005/0223541 | A1 | * | 10/2005 | Ionel et al. | ....................... 29/596 |

FOREIGN PATENT DOCUMENTS

JP 9131003 5/1997

* cited by examiner

*Primary Examiner* — Terrance Kenerly
(74) *Attorney, Agent, or Firm* — Muncy, Geissler, Olds & Lowe, P.C.

(57) ABSTRACT

An electric motor includes a stator and a rotor installed in the stator. The stator has a laminated stator core and at least two stator windings wound on the stator core. The stator core has at least two stator poles facing the rotor and at least two yokes connecting adjacent stator poles. T stator core is constituted by at least two separate members joined together. The at least two stator poles are only arranged at a single one of the at least two separate members.

8 Claims, 6 Drawing Sheets

ELECTRIC MOTOR

CROSS REFERENCE TO RELATED APPLICATIONS

This non-provisional patent application claims priority under 35 U.S.C. §119(a) from Patent Application No. 201110085588.1 filed in The People's Republic of China on Apr. 1, 2011.

FIELD OF THE INVENTION

This invention relates to an electric motor and in particular, to a stator structure of an electric motor.

BACKGROUND OF THE INVENTION

A single phase series motor is also known as a universal motor as it can operate on either AC or DC power. It is a single phase motor with a commutator whose rotor windings are connected in series with stator windings via brushes. Due to its characteristics of high rotating speed, small size, high starting torque, convenient speed regulation and series excitation, the universal motor is commonly used for driving low power appliances that need a high rotating speed, small size and low weight, such as medical devices, power tools, and domestic electric appliances and so on.

A typical known universal motor comprises a stator core which comprises two teeth (stator poles) opposite to each other and two yokes connecting the two teeth at both sides. When the windings are electrified, two magnetic poles with opposite polarity are formed at the stator poles. Traditionally the stator core is formed by stacking a plurality of stator laminations together and each lamination is a monolithic piece with a closing structure. During production, the stator laminations are stacked together to form the stator core firstly, then stator winding are wound on the stator core. It is not convenient to wind windings on a closing structure, so the winding efficiency is low and sometimes the number of turns of the winding is limited.

JP9131003A discloses a motor whose stator core is constituted by assembling a plurality of divided bodies together. During production, the stator windings are wound at the straight parts of the divided bodies firstly, and then the divided bodies with stator windings are assembled together. In this patent application the above mentioned problem is able to be solved. However, the concentricity of the pole arcs of the stator poles can not be assured as undesired position deviation between the pole arcs may generate during the assembly of the divided bodies.

Hence there is a desire for a single phase electric motor with an improved stator structure.

SUMMARY OF THE INVENTION

One aspect of the present invention provides an electric motor comprising a stator and a rotor installed in the stator, the stator comprising a stator core and at least two stator windings wound on the stator core, the stator core being formed by stacking a plurality of stator laminations in an axial direction of the rotor and comprising at least two stator poles facing the rotor and at least two yokes connecting adjacent stator poles, each stator lamination being constituted by at least two separate members joined together, wherein the at least two stator poles are only arranged at a single one of the at least two separate members.

Preferably, the stator further comprises two end brackets respectively arranged on both sides of the stator core in the axial direction, each end bracket being fixed only to a single one of the at least two separate members.

Preferably, the stator core comprises two stator poles opposite to each other and two U-shaped yokes connecting the stator poles at both sides, two magnetic poles with opposite polarity being generated at the stator poles when the stator windings are electrified.

Preferably, the stator lamination is constituted by a strip member and a U-shaped member having two branches and a base connecting the branches, the two stator poles being arranged at the two branches.

Preferably, the stator further comprises two end brackets respectively arranged on both sides of the stator core in the axial direction, each end bracket bridging between the two branches.

Preferably, the end brackets are made of magnetically conductive material.

Another aspect of the present invention provides an electric motor comprising a stator and a rotor installed in the stator, the stator comprising a stator core, at least two stator windings wound on the stator core and two end brackets respectively arranged on both sides of the stator core in an axial direction of the rotor, the stator core being formed by stacking a plurality of stator laminations in the axial direction and comprising at least two stator poles facing the rotor and at least two yokes connecting adjacent stator poles, each stator lamination comprising at least two separate members joined together, wherein each end bracket is fixed only to a single one of the at least two separate members.

A further aspect of the present invention provides an electric motor comprising a stator and a rotor installed in the stator, the stator comprising a stator core, four stator windings and two end brackets respectively arranged on both sides of the stator core in an axial direction of the rotor, the stator core comprising two stator poles facing each other and the rotor and two U-shaped yokes connecting the two stator poles at both sides, each U-shaped yoke having two branch portions and a base portion connecting the two branch portions, the stator windings generating two magnetic poles with opposite polarity at the stator poles when electrified, wherein each U-shaped yoke has two of the four stator windings disposed thereon; and each end bracket bridges between the base portions of the U-shaped yokes and is fixed to the U-shaped yokes at positions between said two stator windings.

Preferably, the end brackets are made of magnetically conductive material.

Preferably, the two of the four stator windings are disposed on each of the two branch portions of the corresponding U-shaped yoke.

Preferably, the stator core is formed by stacking a plurality of stator laminations in the axial direction, each stator lamination comprising at least two separate members joined together.

Preferably, each stator lamination is constituted by two separate U-shaped members, each U-shaped member having two branches, and each stator pole being formed by two stator pole portions extending from respective branches of the two U-shaped members.

Alternatively, each stator lamination is constituted by a U-shaped member having two branches and a strip member joined together.

Preferably, one of the stator poles is arranged at the U-shaped member and the other one is arranged at the strip member.

Preferably, the stator poles are arranged at the two branches of the U-shaped member.

Preferably, each end bracket is fixed only to the two branches of the U-shaped member.

Alternatively, each stator lamination is constituted by four separate members which are joined together by four pairs of joining surfaces having joining structures, the four pairs of joining surfaces being arranged at four corners of the two U-shaped yokes.

Alternatively, each stator lamination is constituted by four separate members which are joined together by four pairs of joining surfaces having joining structures, the four pairs of joining surfaces being arranged at the stator poles.

According to the embodiments of the present invention, the concentricity of the pole arcs of the stator poles can be assured, the end brackets can be mounted on a planar surface and the motor cost can be lowered.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
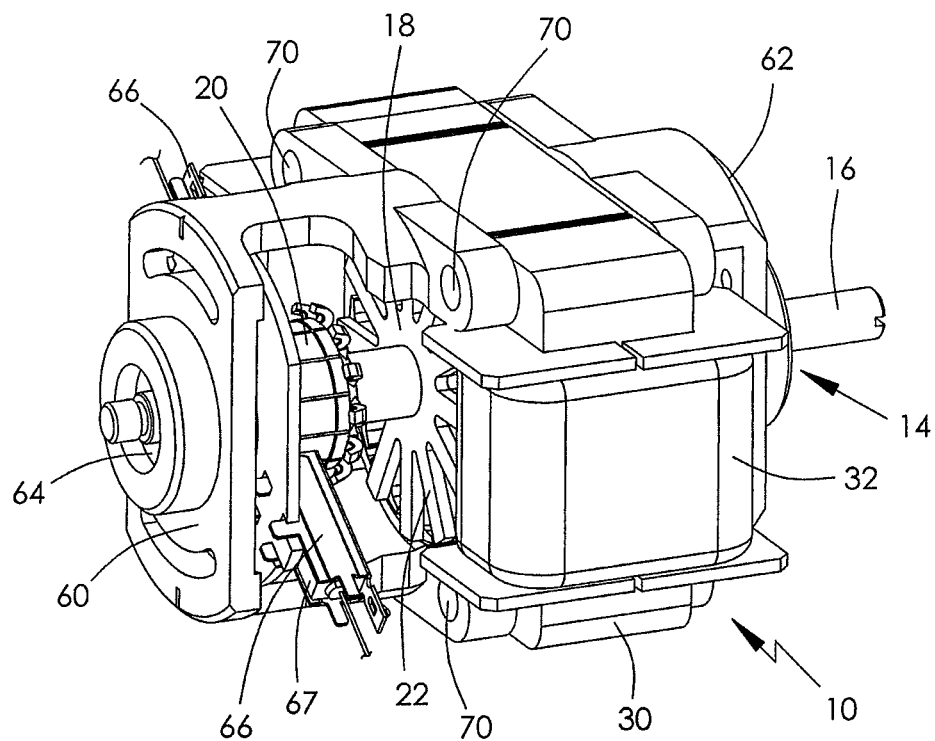
FIG. 1 is a view of an electric motor in accordance with a preferred embodiment of the present invention.
Figure 2:
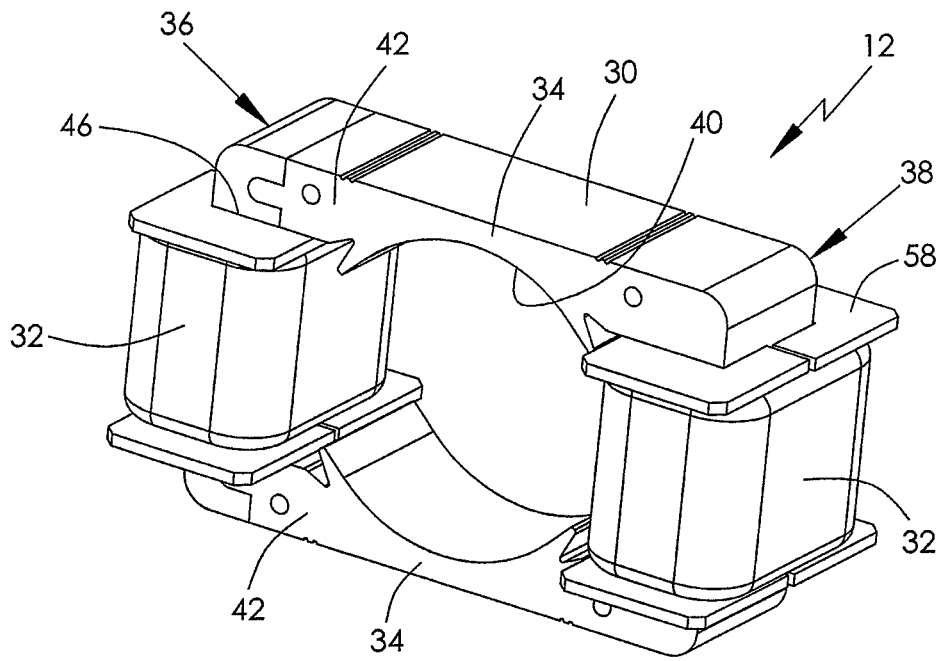
FIG. 2 is a view of a stator of the motor of FIG. 1.
Figure 3:
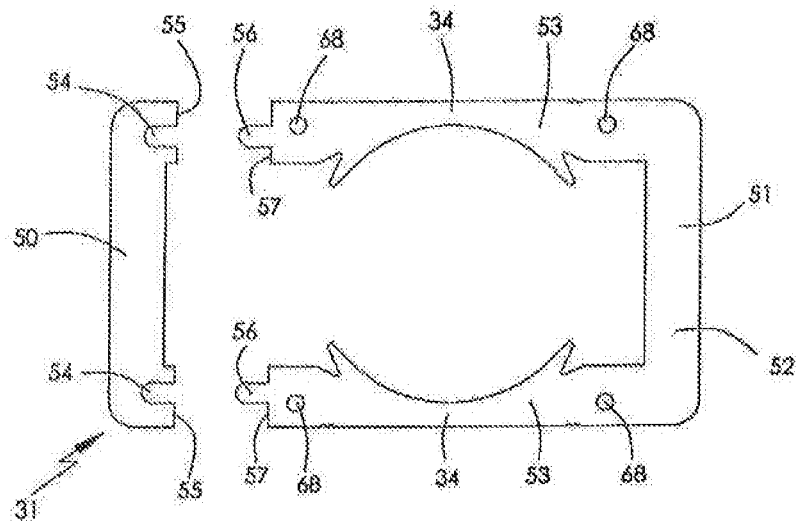
FIG. 3 is a view of a stator lamination of the stator of FIG. 2.

Referring to FIGS. 1 to 3, a single phase series motor 10, in accordance with a preferred embodiment, includes a stator 12 and a rotor 14 installed in the stator 12. The rotor 14 includes a shaft 16, a rotor core 18 fixed on the shaft 16, a commutator 20 fixed on the shaft 16 adjacent to the rotor core 18, and rotor windings (not shown in the Figures) wound about teeth 22 of the rotor core 18 and electrically connected to segments of the commutator 20.

The stator 12 includes a stator core 30 and stator windings 32. The stator core 30 is formed by stacking a plurality of stator laminations 31 together in an axial direction of the shaft 16 and includes a pair of stator poles 34 facing each other and a pair of U-shaped yokes 36 and 38 connecting the stator poles 34 at both sides. The rotor 14 is disposed between arcuate pole faces 40 of the stator poles 34. Each yoke 36, 38 has two branch portions 42 and a base portion 46 connecting the two branch portions 42. Two stator windings 32 are respectively wound about the base portions 46 of the yokes 36 and 38 and generate two magnetic poles with opposite polarity at the stator poles 34 when electrified. Each stator lamination 31 has a strip member 50 and a U-shaped member 52 which together define a closed structure. The stator poles 34 inwardly extend from two branches 53 of the U-shaped member 52. The strip member 50 and the U-shaped member 52 are joined together by two pairs of joining surfaces 55 and 57. The surfaces 55 and 57 respectively have a groove 54 and a projecting rib 56 engaged in the groove 54. During production, a plurality of strip members 50 and a plurality of U-shaped members 50 are respectively stacked together to form two divided bodies, and then insulated bobbins 58 are disposed on the two divided bodies and the stator windings 32 are wound about the insulated bobbins 58. The two divided bodies with the stator windings 32 are then assembled together.

End brackets 60 and 62 are disposed at ends of the stator core 30 in the axial direction of the shaft. The shaft 16 is rotatably supported by bearings 64 mounted to the end brackets 60 and 62. A pair of brush holders 66 are fixed to the end bracket 60. Brushes 67 are inserted into the brush holders 66 to make sliding contact with segments of the commutator 20. The stator windings 32 are electrically connected to the rotor windings via the brushes 67 and the commutator 20. Each end bracket 60, 62 bridges between the two branches 53 of the U-shaped member 52. The end brackets 60, 62 and the stator core 30 are fixed to each other by screws inserted through mounting holes 68, 70 on the end bracket and the branches 53. In this embodiment, as there is a relatively high magnetic potential difference between the two branches 53, the end brackets 60, 62 are made of non-magnetically conductive material such as aluminum, plastic or the like to prevent magnetic flux from being leaked through the end brackets.

Figure 4:
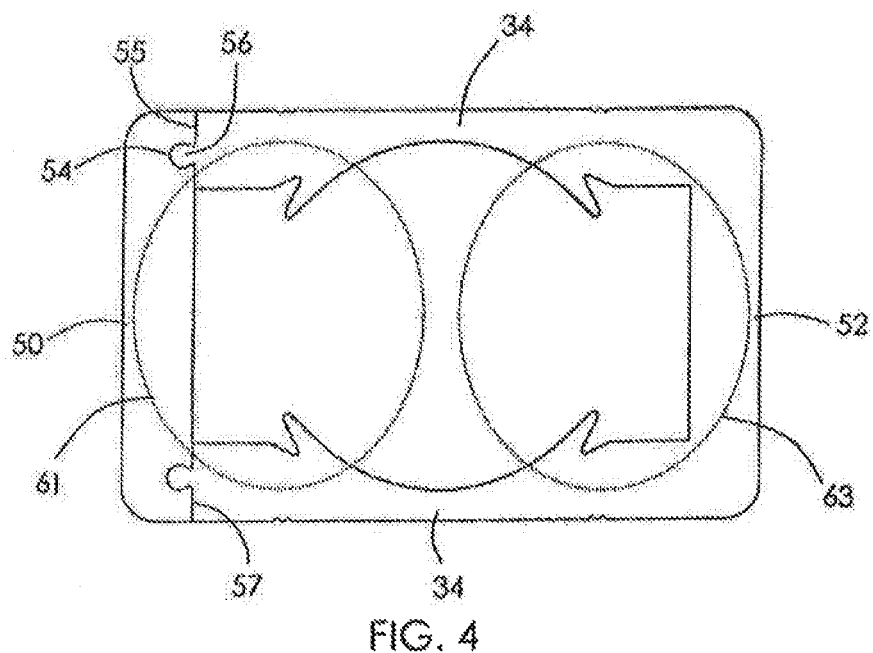
FIGS. 4 to 6 are modifications of the stator lamination of FIG. 3.
Figure 5:
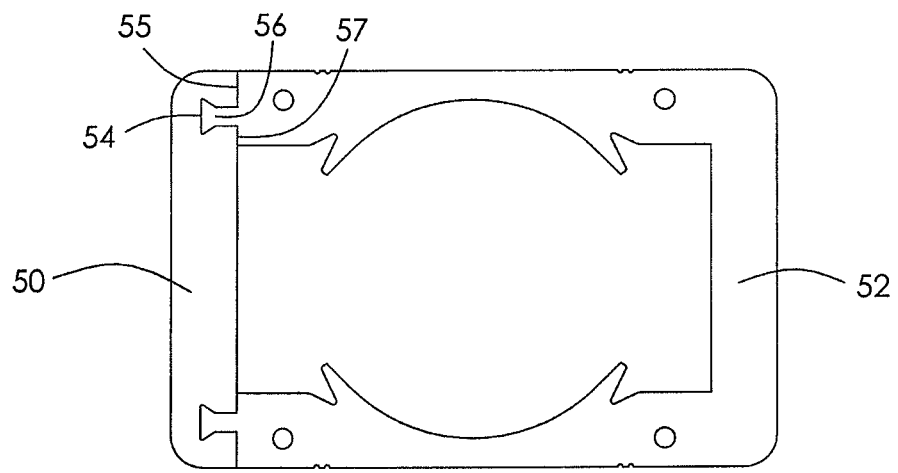
Figure 6:
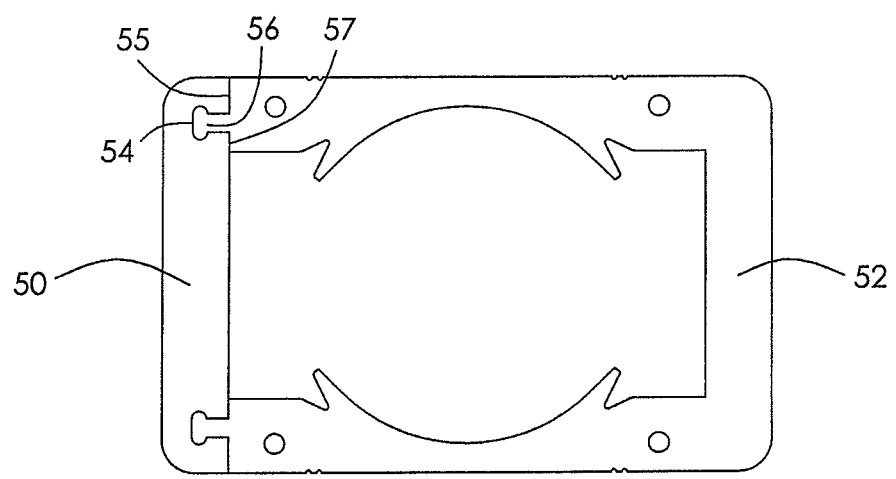

FIGS. 4 to 6 show modifications of the stator lamination of FIG. 3. In the figures, joining structures with different shapes are formed by the grooves 54 and projecting ribs 56 on the joining surfaces 55, 57 of the strip member 50 and the U-shaped member 52. In FIG. 3, the rib is a parallel sided projection with a rounded end. In FIG. 4, the rib is substantially round in plan view having a neck portion to resist lateral separation fro the strip member 50. Two magnetic circuits 61 and 63 generated by the two stator poles 34 when the stator windings are electrified are also shown. In FIG. 5, the rib is wedge-shaped and in FIG. 6 the rib is T-shaped.

In the preferred embodiment, the stator poles 34 both integrally extend from the U-shaped member 52, so the relative position between the pole faces 40 of the stator poles 34 is fixed after the U-shaped member 52 is formed and possible position deviation between the pole arcs 40 generated during the assembly can be avoided, thereby the concentricity of the pole arcs 40 being assured. On the other hand, as each end bracket 60, 62 is only fixed to the U-shaped member 62, it is assured that each end bracket 60, 62 is mounted on a horizontal plane.

Figure 7:
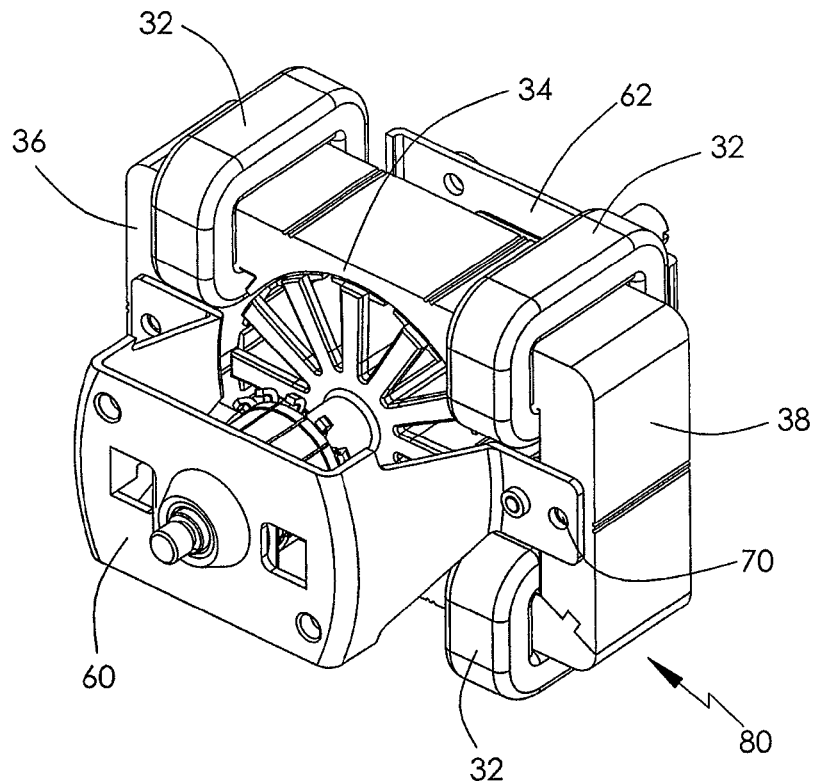
FIG. 7 is a view of an electric motor in accordance with another embodiment of the present invention.
Figure 8:
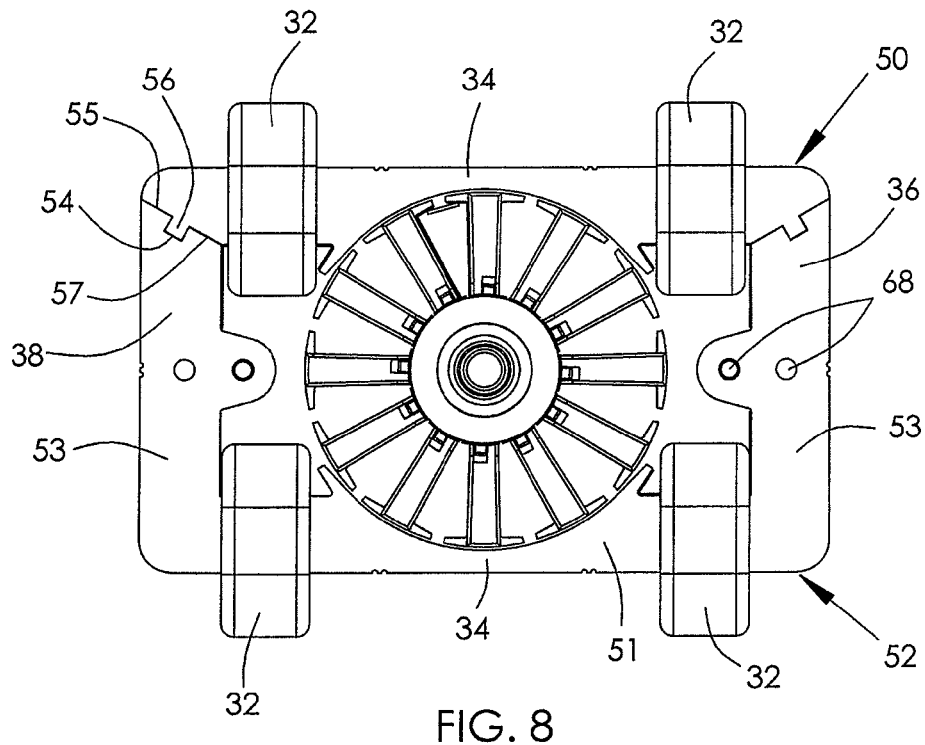
FIG. 8 is a planar view of the motor of FIG. 7, with end brackets removed.

FIG. 7 is a view of an electric motor 80 in accordance with a second embodiment of the present invention. FIG. 8 is a plan view of the motor 80 with end brackets removed. In this embodiment, the stator lamination has a strip member 50 and a U-shaped member 52 which are joined together by two pairs of joining surfaces 55 and 57 having grooves 54 and projecting ribs 56. One of the two stator poles 34 inwardly extends from the base 51 of the U-shaped member 52 and the other one inwardly extends from the strip member 50. Four stator windings 32 are respectively wound about portions of the U-shaped yokes 36 and 38 connecting the stator poles and generate two magnetic poles with opposite polarity at the stator poles 34. Each end bracket 60, 62 bridges between the two branches 53 of the U-shaped member 52. The end brackets 60, 62 and the stator core 30 are fixed together by screws inserted through mounting holes 68, 70 on the end bracket and the branches 53. In this embodiment, the magnetic potential difference between the two branches 53 of the U-shaped member 52 is low, so the end brackets 60, 62 can be made of magnetically conductive material such as iron to lower the cost. Similar to the motor 10, each end bracket 60, 62 is only fixed to the U-shaped member 52 and can be mounted on a horizontal plane.

Figure 9:
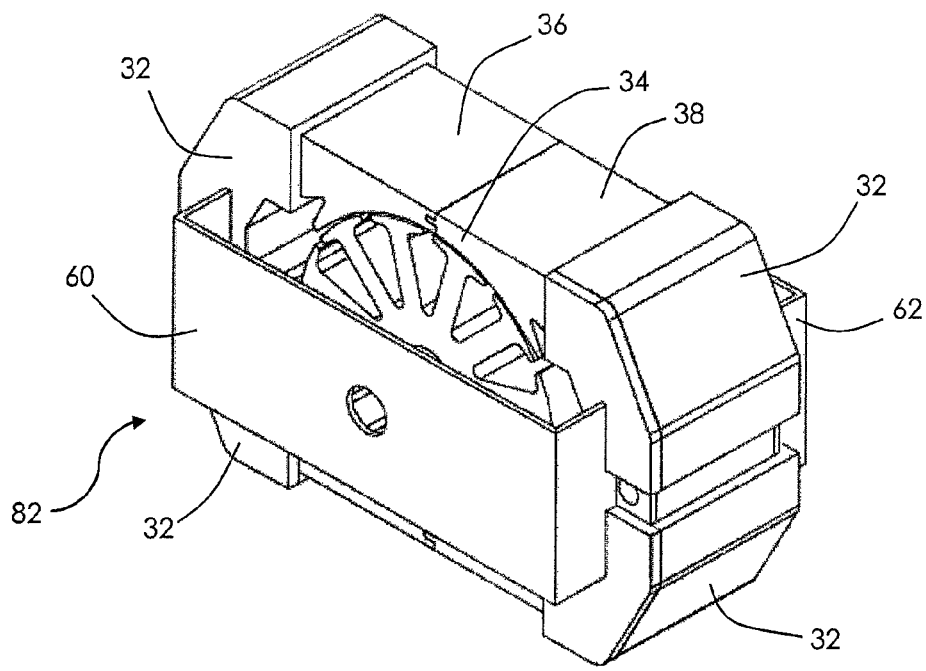
FIG. 9 partially shows an electric motor in accordance with a third embodiment of the present invention.
Figure 10:
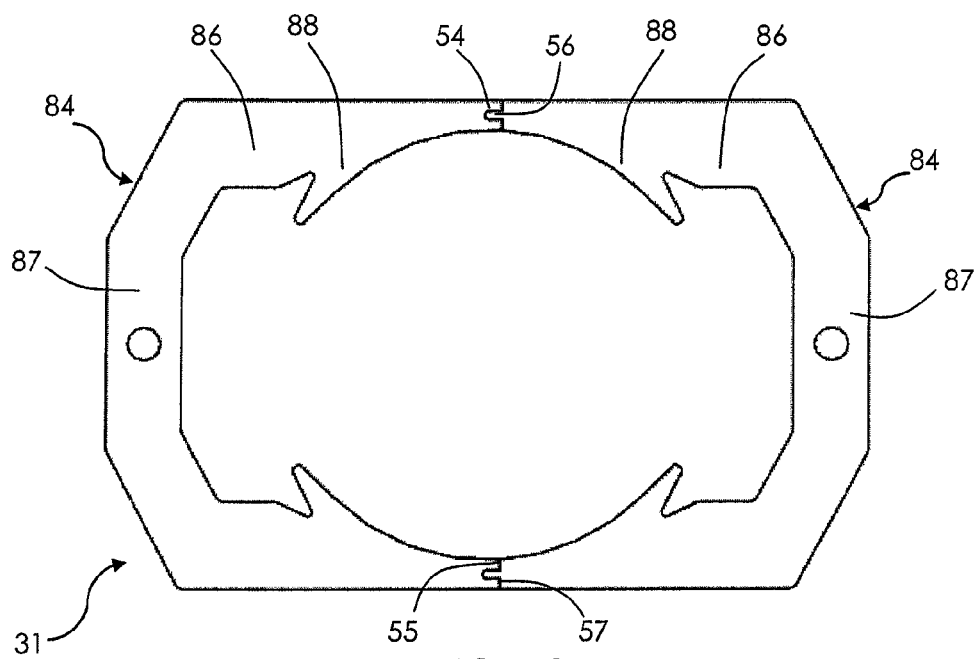
FIG. 10 is a view of a stator lamination of the motor of FIG. 9.

FIG. 9 partially shows an electric motor 82 in accordance with a third embodiment of the present invention. FIG. 10 is a view of a stator lamination of the motor 82. In this embodiment, the stator lamination 31 has two U-shaped members 84 which are joined together by two pairs of joining surfaces 55 and 57 having grooves 54 and projecting ribs 56. The two pairs of joining surfaces are respectively disposed at the stator poles 34. Each stator pole 34 is constituted by two stator pole portions 88 respectively extending from two opposite branches 86 of the two U-shaped members 84. Four stator windings 32 are respectively wound about the U-shaped yokes 36 and 38 at four corners. By this configuration, stator windings 32 with more turns can be allowed. Each end bracket 60, 62 bridges between two bases 87 of the two U-shaped members 84 and are preferably made of magnetically conductive material to lower the cost, as the magnetic potential difference between the connection points is low.

Figure 11:
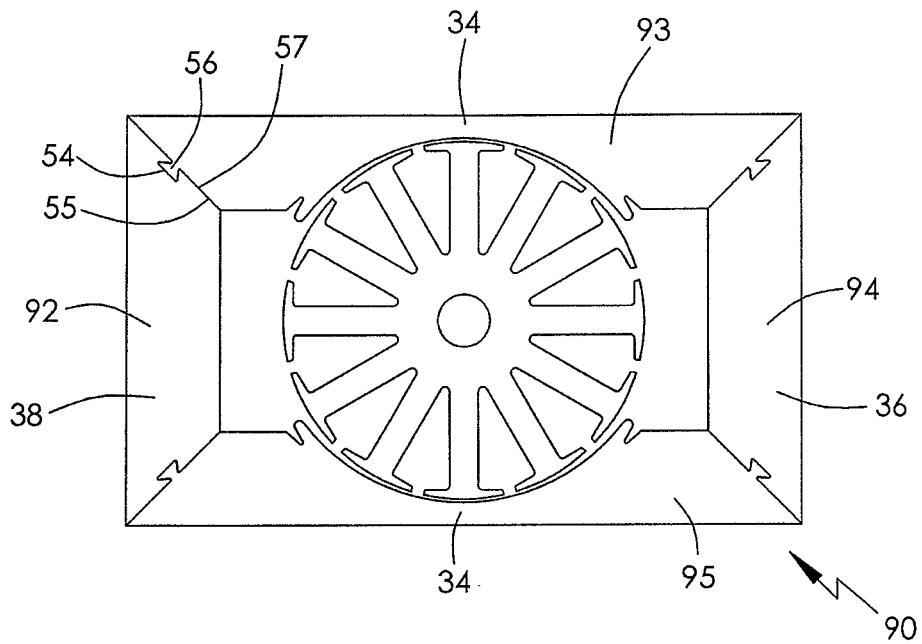
FIG. 11 partially shows a stator core and a rotor core of an electric motor in accordance with a fourth embodiment of the present invention.

FIG. 11 partially shows a stator core and a rotor core of an electric motor 90 in accordance with a fourth embodiment of the present invention. In this embodiment, the stator lamination 31 is constituted by four separate strip members 92~95 which are joined together by four pairs of joining surfaces 55 and 57 at four corners. The groove 54 and the projecting rib 56 of each pair of joining surfaces form a joining structure. The two stator poles 34 inwardly extend from two opposite strip members 93 and 95. One or two stator coils (not shown) may be disposed on each U-shaped yoke 36, 38.

Figure 12:
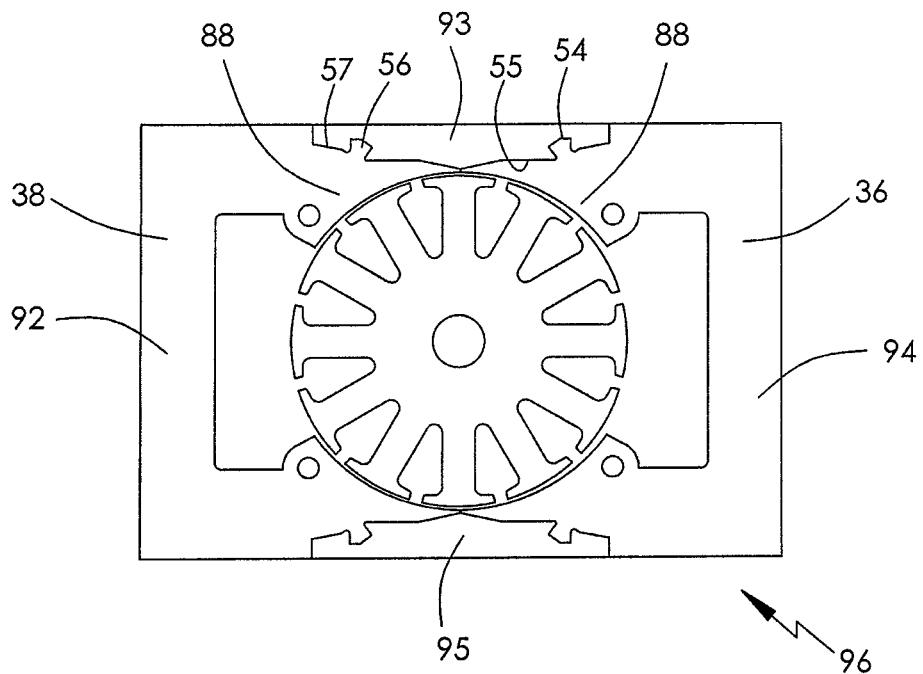
FIG. 12 partially shows a stator core and a rotor core of an electric motor in accordance with a fifth embodiment of the present invention.

FIG. 12 partially shows a stator core and a rotor core of an electric motor 96 in accordance with a fifth embodiment of the present invention. In this embodiment, the stator lamination is constituted by four separate members 92~95 which are joined together by four pairs of joining surfaces 55 and 57 at the two stator poles 34. The separate members 92 and 94 are U-shaped and disposed opposite to each other. Each stator pole 34 is constituted by one of the separate members 93 and 95 and two stator pole portions respectively extending from two branches of the two U-shaped members 92 and 94. One or two stator coils (not shown) may be disposed on each U-shaped yoke 36, 38.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor, comprising:
a stator, comprising
a stator core; and
at least two stator winding wound on the stator core, the stator core being formed by stacking a plurality of stator laminations in an axial direction of the rotor and comprising at least two stator poles and at least two yokes at opposite ends of the stator core connecting adjacent stator poles, the stator winding being respectively wound around a base of the yokes, the being disposed between arcuate pole faces of the stator poles and being arranged on a center of the at least two yokes; and
a rotor installed in the stator,
wherein each stator lamination is constituted by a strip member and a U-shaped member, separate from the strip member, having two branches and a base connecting the branches, the two stator poles being arranged at the two branches,
wherein one of the two stator windings is only wound on the strip member and another of the two stator winding is only wound on the U-shaped member, and
wherein the at least two stator poles generate at least two magnetic circuits respectively passing through the at least two yokes when the stator windings are electrified.

2. The motor of claim 1, wherein the stator further comprises two end brackets respectively arranged on both sides of the stator core in the axial direction, each end bracket being fixed only to one of the U-shaped member or the strip member.

3. The motor of claim 2, wherein the end brackets are made of magnetically conductive material.

4. The motor of claim 1, wherein the stator core comprises two stator poles opposite to each other and two U-shaped yokes connecting the stator poles at both sides, two magnetic poles with opposite polarity being generated at the stator poles when the stator windings are electrified.

5. The motor of claim 1, wherein the stator further comprises two end brackets respectively arranged on both sides of the stator core in the axial direction, each end bracket bridging between the two branches.

6. the motor of claim 5, wherein the end brackets are made of magnetically conductive material.

7. An electric motor, comprising:
a stator, comprising:
a stator core; and
at least two stator winding wound on the stator core, the stator core being formed by stacking a plurality of stator laminations in an axial direction of the rotor and comprising at least two stator poles facing the rotor and at least two yokes at opposite ends of the stator core connecting adjacent stator poles, the stator windings being respectively wound around a base of the yokes; and
a rotor installed in the stator, the rotor being disposed between arcuate pole faces of the stator poles and being arranged on a center of the at least two yokes,
wherein each stator lamination is constituted by strip member and a U-shaped member, separate from the strip member, having two branches and a base connecting the branches, the two stator poles being arranged at the two branches, and
wherein one of the stator winding is only wound on the strip member and another of the two stator winding is only wound on the U-shaped member.

8. An electric motor, comprising;
a stator, comprising:
a stator core; and two stator windings wound on the stator core, the stator core being formed by stacking a plurality of stator laminations in an axial direction of the rotor and comprising at least two stator poles facing the rotor and at least two yokes at opposite ends of the stator core connecting adjacent stator poles, the stator winding being respectively wound around a base of the yokes; and a rotor installed in the stator, the rotor being disposed between arcuate pole faces of the stator poles and being arranged on a center of the at least two yokes, wherein each stator lamination is constituted by a strip member and a U-shaped member, separate from the strip member, having two branches and a base connecting the branches, the two stator poles being arranged at the two branches, and wherein one of the two stator windings is only wound on the strip member and another of the two stator windings is only wound on the U-shaped member.

* * * * *